Sept. 20, 1938.　　　G. W. BATCHELL　　　2,130,831
FRAMED GLAZING UNIT
Filed March 25, 1937

Inventor
George W. Batchell
By
Attorney

Patented Sept. 20, 1938

2,130,831

UNITED STATES PATENT OFFICE 2,130,831

FRAMED GLAZING UNIT

George W. Batchell, Toledo, Ohio

Application March 25, 1937, Serial No. 133,033

2 Claims. (Cl. 20—56.5)

This invention relates to window sections.

This invention has utility especially in connection with vitreous or glass panes having fused framing therefor which may be assembled into sealed air chamber panels adapted for temperature insulation.

Referring to the drawing.

Figure 1:
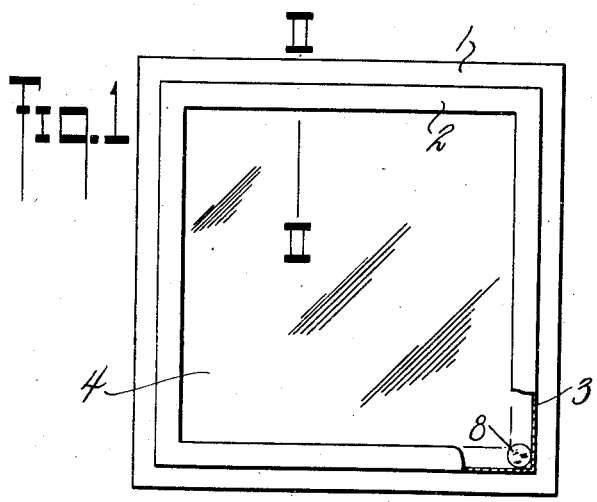
Fig. 1 is a side view, with parts broken away, of a panel unit.
Figure 2:
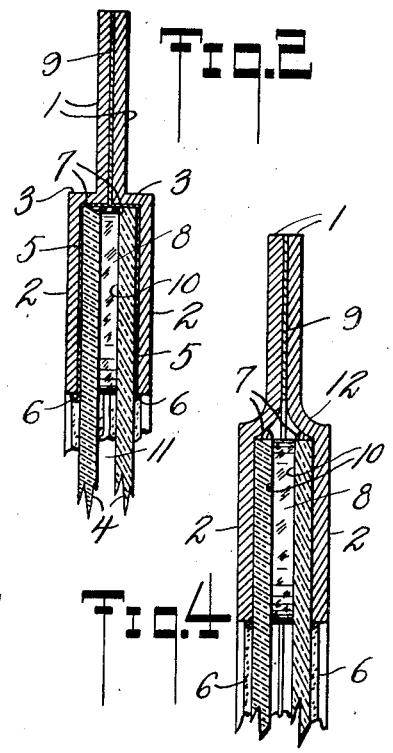
Fig. 2 is a section on the line II—II, Fig. 1.
Figure 3:
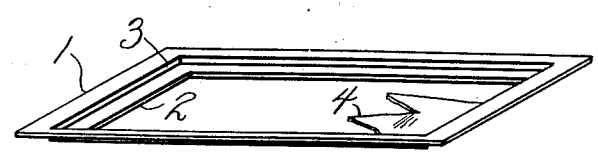
Fig. 3 is a perspective view of a frame with partial pane therein.

These units for the frames desirably are offset to provide outer flange 1, inner flange 2, intermediate offset 3, wherein the flange 2 and offset 3 provide a seat for pane 4. This structural shape of the flanges 1, 2, and intermediate offset 3 is of sheet metal and of Z-shape cross-section. In the assembly herein as of glass, the flange 2 and seat 3 are desirably surface coated with bonding agent 5 as the solder of J. Showles MacLean, Patent No. 2,035,241, of March 24, 1936.

This unit between the pane 4 and frame is further perfected (1) at corners or grooves therebetween by supplemental metal or solder bonding 6 at the terminal portion of the flange 2, and (2) at endless solder or fused portion 7 at the offset 3 adjacent the opposite sides of the pane 4 from that having the bonding 6. It is thus seen that there is endless seat at the offset 3; endless bonding along said surface, as endless union 5 therebetween, supplemented by the reinforcing bondings 6, 7. There is thus a framed element. Such may be associated with a complementary element to place, as a fin-like extension; the flanges 1 in opposed seating relation.

In this assembly there may be yieldable spacing means as cork gasket element 8 introduced; then as between these flanges 1, such may be surfaced with bonding solder 9 therebetween. This completes a panel unit or glazing section armored peripherally for insertion in a standard frame or structural unit, whether for a window in a building, in a vehicle, or refrigerator, and whether or not fixed with such structure or mounted in a movable section. The diaphonous element 4 may be selected either for color or for transmitting selected rays as to actinic effect. Furthermore, the character thereof, whether sheet or plate, and whether thin or heavy, may be adapted for that of the ultimate installation. The compressible packing 8 desirably has thereon shellac 10 as a binding agent against shifting relatively to one of the panes 4. This binding agent holds the packing 8 against shifting into air chamber 11 between the panes of the unit.

Figure 4:
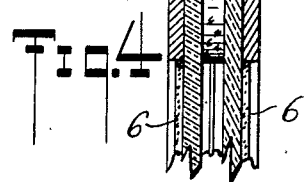
Fig. 4 is a section through a frame assembly having departure in the offset between the flanges from that in Fig. 2.
Figure 5:
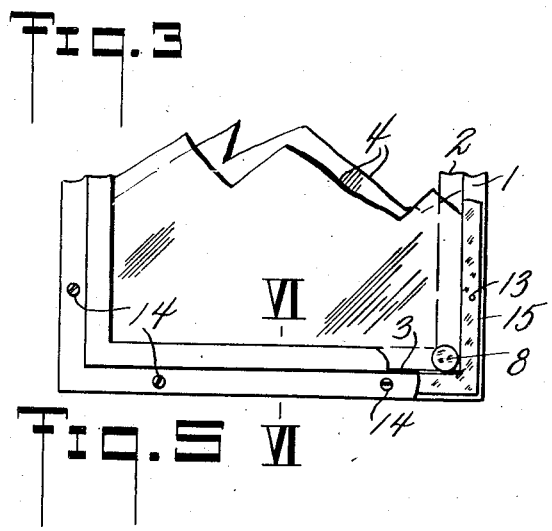
Fig. 5 is a fragmentary view of panel assembly with supplemental gasket sealing in addition to the bonding therebetween.

In lieu of the abrupt offset 3, there may be tapered offset 12 (Fig. 4). This is a cushioning form of construction avoiding strains from expansion and contraction, although experience with the solder as the bonding agent between the metal and pane has, with thin sheet metal framing, been effective for such holding as to maintain sealing of the air chamber 11 under wide temperature changes.

Figure 6:
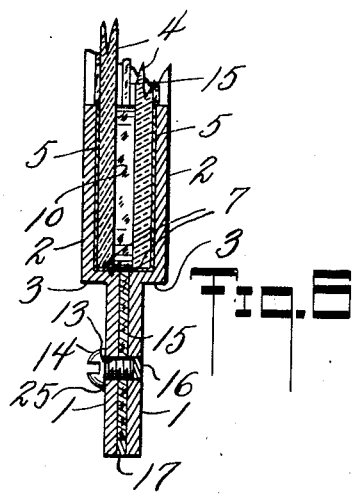
Fig. 6 is a section on the line VI—VI, Fig. 5.
Figure 7:
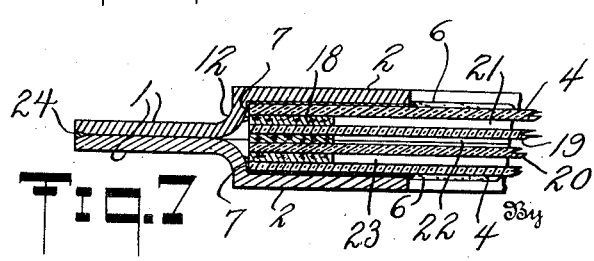
Fig. 7 is a section at the frame involving a plurality of air chambers for the unit.

The outer flange 1 of these panel units as away from the pane proper may have openings 13 (Fig. 6) therein to receive assembly screw 14, thereby to effect gripping of wafer or cork gasket seal 15. There is thus a cushioning assembly, and these screws 14 may be supplementally sealed by solder 16 and the bonding completed by peripheral solder 17.

To this end, compressible packing 18 may be continuous or endless as to intermediate panes 19, 20, in spacing therefrom the outer panes 4, thereby providing intermediate air chambers 21, 22, 23, instead of the single air chamber 11. The outer panels 4 may have full bond sealing with the frame. With this grouping for the unit, the outer flanges 1 may, in lieu of surface bonding, have terminal bonding 24 as a recess filler.

Solder 25 may be at the heads of the screws 14.

What is claimed and it is desired to secure by United States Letters Patent is:

1. A double glazed panel comprising two similar metal frames of Z cross-section having a pane in the offset portion of each frame and soldered to said frame, resilient spacing means between said panes, a separate continuous gasket between the outermost flanges of the frames, and an independent seal of solder about the periphery of the assembly.

2. A double glazed panel comprising two similar metal frames of Z cross-section having a pane in the offset portion of each frame and soldered to said frame, resilient spacing means between said panes, and an independent seal of solder about the periphery of the assembly.

GEORGE W. BATCHELL.